United States Patent [19]

Vinson

[11] Patent Number: 4,842,217
[45] Date of Patent: Jun. 27, 1989

[54] SELF DESTRUCT VIDEO TAPE CASSETTE

[76] Inventor: David A. Vinson, 807 Lincolnway South, Ligonier, Ind. 46767

[21] Appl. No.: 235,018

[22] Filed: Aug. 22, 1988

[51] Int. Cl.$^4$ .............................................. G11B 23/02
[52] U.S. Cl. ...................................... 242/199; 360/132
[58] Field of Search ................ 242/198, 199; 360/132, 360/137, 60

[56] References Cited

U.S. PATENT DOCUMENTS

| | | |
|---|---|---|
| 3,839,736 | 10/1974 | Hoshall . |
| 3,880,351 | 4/1975 | Bogart . |
| 3,949,201 | 4/1976 | Bogart . |
| 3,949,202 | 4/1976 | Bogart . |
| 4,466,584 | 8/1984 | Chevalier et al. . |
| 4,586,101 | 4/1986 | Vogelgesang ................... 242/199 X |
| 4,644,422 | 2/1987 | Bedini . |
| 4,660,115 | 4/1987 | Westfall et al. ..................... 360/132 |
| 4,660,116 | 4/1987 | Westfall et al. .................. 242/199 X |
| 4,702,434 | 10/1987 | Brauer ................................. 242/198 |
| 4,763,784 | 8/1988 | Newell ............................ 242/199 X |

Primary Examiner—Stuart S. Levy
Assistant Examiner—John M. Eghtessad
Attorney, Agent, or Firm—Jeffers, Hoffman & Niewyk

[57] ABSTRACT

A video tape cassette including a supply reel and a take-up reel and guide rollers for guiding the tape from said supply reel to the take-up reel. A portion of the tape is accessible to the reading head of a video player. A mutilating device, such as a cutting blade, is positioned adjacent the path of the leading portion of the tape so that the tape will be cut into strips prior to rewinding the tape on the take-up reel, whereby the video cassette is suitable for a one time only viewing. A cap is provided for locking the supply reel to the housing of the video tape cassette during shipment to prevent rotation of the supply reel. A simple dust cover is provided which may be completely removed from the video tape cassette and which seals the video tape cassette during shipment.

14 Claims, 2 Drawing Sheets

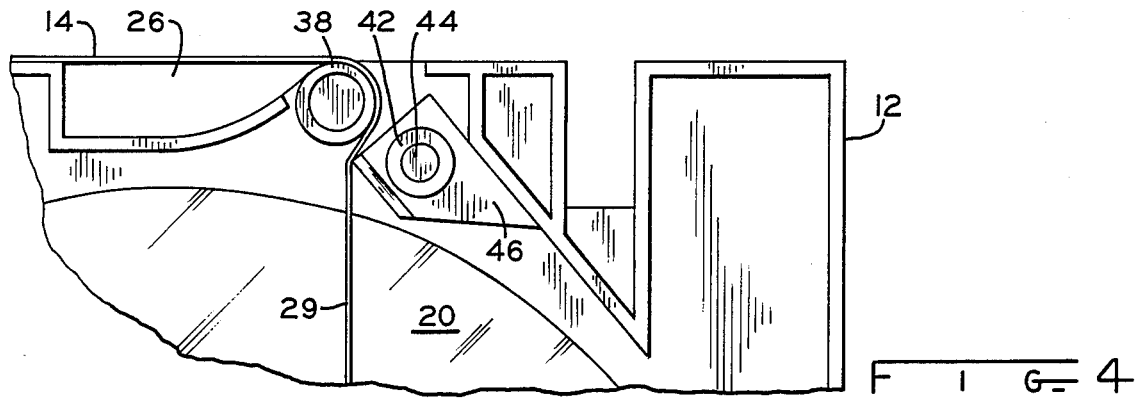
FIG-4
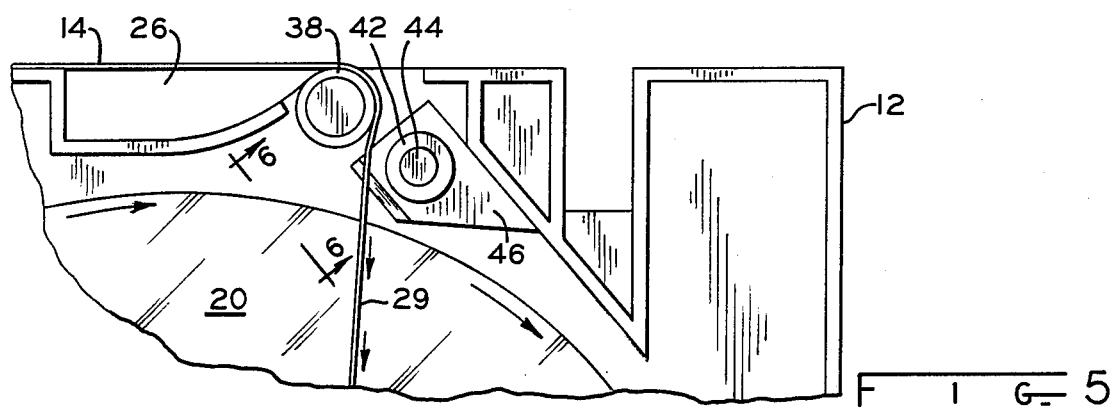
FIG-5
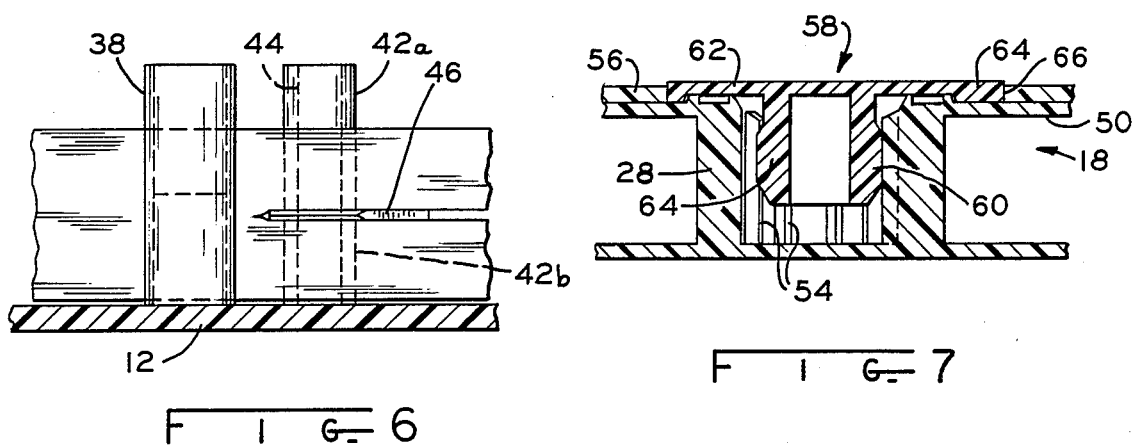
FIG-6
FIG-7

SELF DESTRUCT VIDEO TAPE CASSETTE

BACKGROUND OF THE INVENTION

This invention relates to video tape cassettes and in particular to a VCR cassette which is suitable for only a one time viewing.

Video tape cassettes which are to be used with either the VHS or Beta format are generally rented by owners of VCR machines to view pre-recorded video cassette material, for instance, movies. Generally these rented cassettes are suitable for repeated viewing. However, there is a need for low cost video tape cassettes which are suitable for one time only viewing whereby the video cassettes cannot be reused. For instance, such one time viewable cassettes could be sold directly from the owners of pre-recorded programs and materials to the ultimate customer in a low cost video cassette which could be viewed only once, thereby bypassing the expense of distribution of the video tape cassettes through rental outlets. Accordingly it is desired to provide a video tape cassette which is suitable for one time viewing only and wherein the magnetic tape which has the information prerecorded thereon, is physically no longer usable after the tape is read for a one time viewing.

Various one time viewable tape cassettes have been available in the prior art, such as video tape cassettes wherein the information is erased after a one time viewing, or wherein the video tape cassette, after a predetermined number of viewings locks up, whereby it cannot be viewed any further.

These prior art one time viewable tape cassettes were unsatisfactory in that they were not tamper proof. Thus, for instance, the cassettes could be opened and the supply reel with the tape wound thereon could be mounted in another video tape cassette housing to defeat the viewing limitation imposed on the video tape cassette. Additionally, by defeating the one time viewing limitation, the information could be recorded on another blank tape, thereby again destroying the purpose and effect of the one time viewing feature.

It is therefore desired to provide a video tape cassette which can be viewed only once, is tamper proof and not subject to tampering to defeat the viewing limitation.

A further disadvantage of prior art one time viewing video tape cassettes has been that they have been relatively costly. Conventional video tape cassettes include numerous parts and features which are designed for the convenience of a viewer who rents the cassette. These features add additional cost to the video tape cassette. Such features include, for instance, the pivotal molded plastic dust cover which is conventionally included with video tape cassettes to protect the exposed portion of the tape, the conventional plastic book-like enclosure or shipping box which is used for storing video tape cassettes. Still another such feature is the clear plastic windows whereby the interior of the video tape cassette can be viewed to determine how much of the video tape cassette has been taken up on the take-up reel. It is therefore desired to provide a one time viewing video tape cassette which is less costly than conventional windable video tape cassettes.

SUMMARY OF THE INVENTION

The present invention is directed to an improved video tape cassette which is suitable for one time viewing only and which is tamper proof. The video tape cassette of the present invention incorporates a device for mutilating the tape after the tape has been viewed once and before the tape is rewound on the take-up reel. Thus the tape is mutilated or destroyed after one use of the cassette and the pre-recorded information can be only once. The housing in which the tape take-up and supply reels are housed is sealed and cannot be tampered with by users.

The video tape cassette according to the present invention includes a housing, supply and take-up reels rotatably mounted in the housing, and a flexible magnetic tape which includes pre-recorded information thereon. The tape is wound on the supply reel and has a leading end thereof wound onto the take-up reel. A mutilating device, such as a cutting blade, is mounted adjacent the leading 10 portion of the tape whereby the tape is progressively cut or mutilated as the tape is taken up by the take-up reel from the supply reel.

One advantage of the video tape cassette according to the present invention is that it is relatively inexpensive to manufacture.

Another advantage of the video tape cassette according to the present invention is that it is simple in construction.

Still another advantage of the present invention that the video tape cassette can be used with conventional video tape cassette players.

A further advantage of the video tape cassette according to the present invention is that it is tamper proof.

A still further advantage of the video tape cassette according to the present invention is that it permits the distribution of video tape cassettes directly from the manufacturers of pre-recorded video tape cassettes to the ultimate user, thereby eliminating distribution costs.

A video tape cassette, according to the present invention, includes a housing defining a generally enclosed chamber. A supply reel and tape reel are rotatably mounted within the chamber. The supply reel has a flexible magnetic tape wound thereon with the tape including pre-recorded information. The take-up reel receives tape from the supply reel as the video tape cassette is being viewed in a playing machine, whereby a portion of the tape is accessible to the reading head as the tape is being wound on the take-up reel. A mutilating device is mounted in the chamber for progressively mutilating the tape as the tape is being wound onto the take-up reel. Thus, the tape may be read only once for a one time viewing of the pre-recorded information prior to the progressive mutilation of the tape.

The video tape cassette according to the present invention includes a housing to define a generally enclosed chamber. A supply reel and a take-up reel are rotatably mounted in the chamber. A flexible magnetic tape which has pre-recorded information thereon is wound onto the supply reel and has a leading end portion thereof connected to the take-up reel. Guiding rollers are supported by the housing for guiding the tape from the supply reel to the take-up reel along a pre-determined path. A mutilating device is mounted in the housing adjacent the tape path for progressively mutilating the tape as the tape is wound on the take-up reel from the supply reel, whereby the tape may be read only once for a one time viewing of the pre-recorded information.

The present invention, in one form thereof, comprises a method for using a video tape cassette which has a housing enclosing a supply reel and a take-up reel with a magnetic tape wound on the supply reel. A leading end of the tape is wound on the take-up reel. The method includes the step of recording information on the tape, winding the tape on the supply reel, and then feeding the tape from the supply reel through a video cassette player and winding the tape onto the take-up reel to provide for viewing of the pre-recorded information. The tape is progressively mutilated as the tape is wound on the take-up reel, thereby rendering the tape unfit for further use.

It is an object of the present invention to provide a video tape cassette which is suitable for one time viewing only.

It is another object of the present invention to provide a video tape cassette which is suitable for one time viewing including a mutilation device to mutilate the tape as it is taken up by the take-up reel from the supply reel.

It is still another object of the present invention to provide a video tape cassette wherein the housing is sealed so that the video cassette is tamper proof.

It is yet another object of the present invention to provide a low cost video tape cassette.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings wherein:

FIG. 4 is an enlarged partial plan view of the cutting element of the video tape cassette of FIG. 1;

FIG. 5 is an enlarged partial plan view of the video tape cassette of FIG. 1, similar to FIG. 4, with the cutting knife piercing the tape;

FIG. 6 is a cross sectional view of the cutting element and tape of the video tape cassette taken along lines 6—6 of FIG. 5;

FIG. 7 is a cross sectional view of the supply reel hub of the video tape cassette taken along lines 7—7 of FIG. 3.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DESCRIPTION OF THE PREFERRED EMBODIMENT

Figure 1:
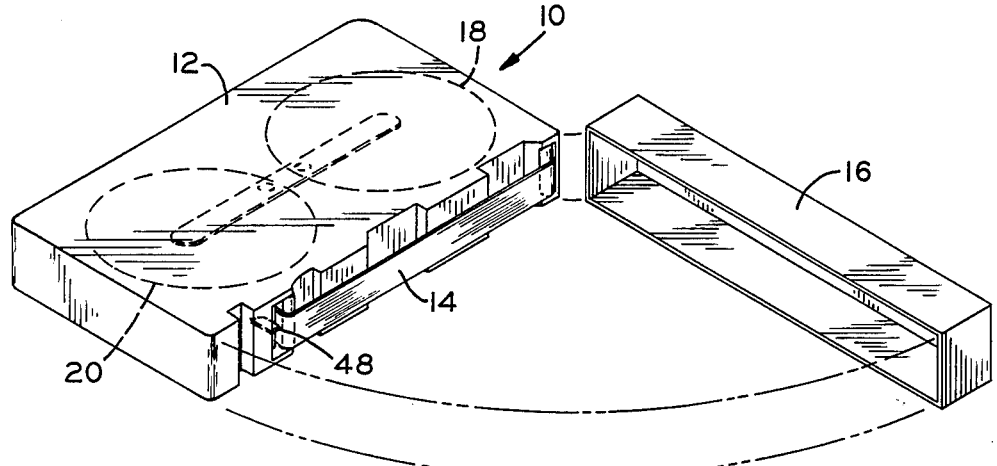
FIG. 1 is a perspective view of the video tape cassette according to the present invention.
Figure 2:
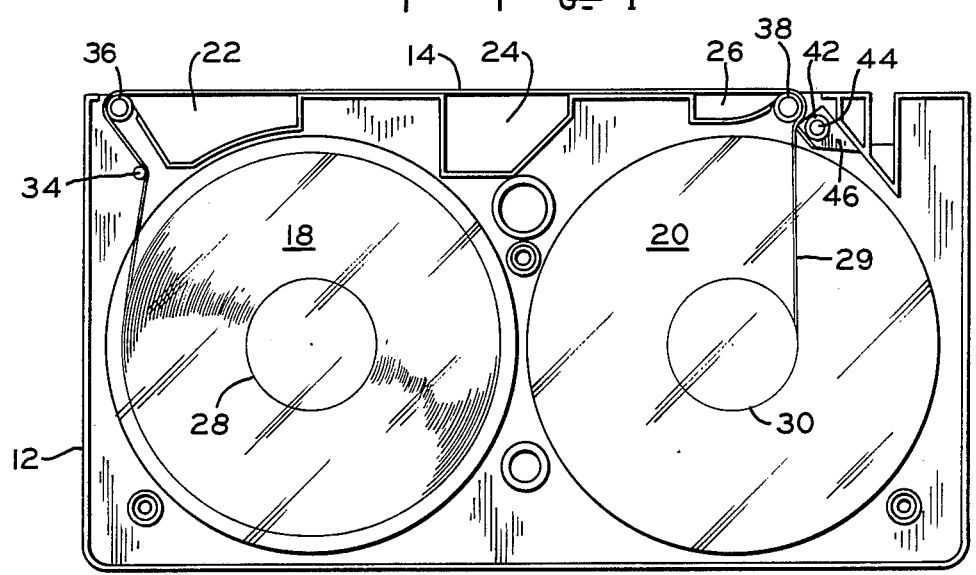
FIG. 2 is a plan view of the video tape cassette of FIG. 1 with the upper housing section removed.

Referring now to FIGS. 1 and 2, there is shown a video tape cassette 10 having a housing 12 and an exposed tape portion 14 of a conventional flexible magnetic tape 15 having a substrate and a layer of magnetic material thereon. The tape has information pre-recorded thereon. A cover 16 is provided to cover exposed tape portion 14 during shipment of the video tape cassette 10. Pre-recorded magnetic tape 15 is wound on the hub 28 of supply reel 18 and a leading end portion 29 of the tape is wound about hub 30 of take-up reel 20. The tape 15 follows a path which leads from the supply reel 18 around a post 34, around a guide roller 36, past recesses 22, 24, and 26, between guide rollers 38 and 42 and then around hub 30. The exposed portion 14 of the tape extends along a straight path which is established by rollers 36 and 38 and passes over recesses 22, 24 and 26 which are formed within the housing 12. When the video tape cassette 10 is inserted into a video cassette playing machine, the recesses 22, 24, and 26 receive rollers or elements (not shown) for guiding the exposed portion 14 of the tape past a playing head whereby the pre-recorded information on the magnetic tape may be displayed.

Housing 12 comprises bottom and top portions which may be molded out of plastic. Rollers 36, 38, and 42 are mounted on posts which are conventionally, integrally molded with plastic casing 12. While conventional cassette housings have been assembled with threaded fasteners, preferably the bottom and top portions of the housing 12, after insertion of the tape 15, supply reel 18 and take-up reel 20 into the housing will be sealed whereby no tampering with the tape is possible. Sealing may be accomplished by use of an adhesive or by bonding the top and bottom casing portions by the application of heat. Furthermore if a person should break apart the top and bottom portions of casing 12, these portions will fracture and will not be suitable for further use.

As best seen in FIGS. 4 and 6 roller 42 is split and consists of two parts 42a and 42b. The leading portion 29 of the tape passes between roller 38 and the split roller 42a and 42b which are mounted on a post 44. A cutting blade 46 is mounted between rollers 42a and 42b. As best seen in FIG. 5, when the video cassette is in use, take-up reel 20 will be rotated, which will cause leading portion 29 to be under some tension whereby cutting blade 46 punctures and slits leading portion 29 of the tape 15 to, thereby physically progressively and continuously puncture the tape 15 as the tape 15 is wound onto the take up reel 20 so that it cannot be reused for further viewings.

In the disclosed embodiment, cutting blade 46 simply cuts the leading tape portion 29. However, it should be understood that other devices for physically mutilating the leading tape portion 29 may also be used. Thus for instance, a pair of mating rollers having protrusions or cutting elements thereon could be positioned so that leading tape portion 29 passes between the rollers and be punctured or otherwise physically marred so that the tape 15 would not be suitable for further reuse.

Figure 3:
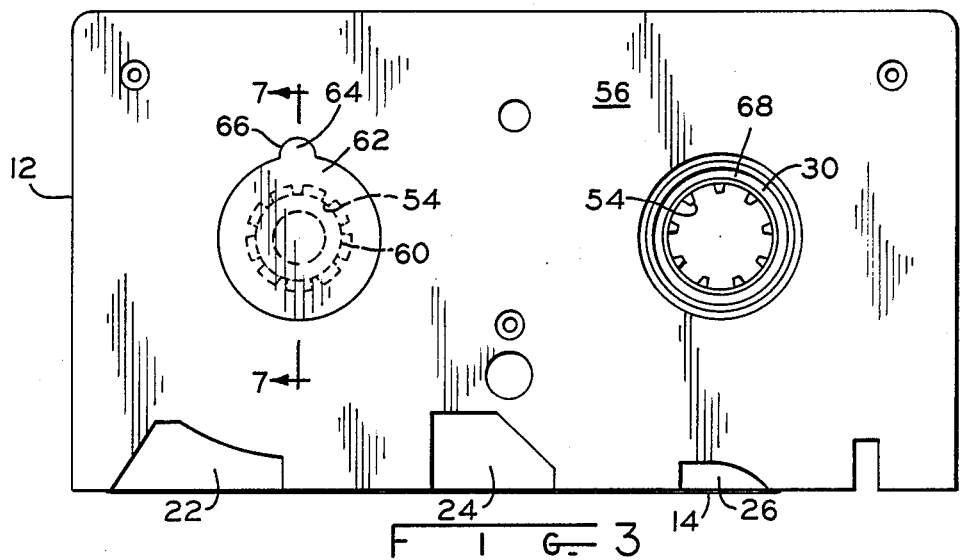
FIG. 3 is a bottom plan view of the video tape cassette of FIG. 1.

Referring now to FIGS. 3 and 7, it can be seen that supply reel 18 is comprised of a hub 28 and respective upper and lower flange portions 50 and 52. Hub 28 includes splines 54. Hub 30 of take-up reel 20 includes similar splines 54. These splines are provided in hubs 28 and 30 in order that reels 18 and 20 may be rotated by suitable drive mechanisms of the video tape cassette playing machine. It is important that, during shipment of the video tape cassette, reels 18 and 20 not be rotated by vibration and the like whereby the tape 15 could unwind and perhaps be damaged. In conventional video tape cassettes, spring loaded rachet mechanisms have been provided to engage with teeth located on the edge of flange 52 of each reel 18, 20 to prevent such rotation. In the instant embodiment, these rachet mechanisms have been eliminated in the interest of cost savings and have been replaced with a cap 58 which includes a stem portion 60 having splines 64 thereon to interlock with splines 54 of the supply reel. The cap furthermore includes a planar portion 62 having a protrusion 64 thereon which interlocks with a mating cavity 66 in bottom cover 56. Thus cap 58 locks supply reel 18 to casing 12 against rotation and prevents the tape from unwinding during shipment. Before the video tape cassette is inserted into a video playing machine cap 58 is removed. A similar cap 58 could be provided for take-up reel 20.

To further insure that the tape cannot be reused, a tape having a wider dimension than conventional tapes could be used for the video tape cassette of the present invention. This width should be only slightly greater than the width of conventional tapes. The video tape may be accommodated by making flanges 50 and 52 of the supply reel, and corresponding flanges of the take-up reel thinner.

A further cost savings for the one time viewing video tape cassette would be the elimination of the viewing windows which have conventionally been included in video tape cassette casings so that the user can determine if the tape needs to be rewound. Since in a video tape cassette according to the present invention there is no need to rewind the video tape as its use is limited to only one performance, no such windows are needed.

A still further embodiment of the video tape cassette according to the instant invention would be to lengthen the shaft of the supply reel 18. The shaft of reel 20 is shown in FIG. 3 at 68 and reel 18 has a similar shaft (not shown). The shaft of supply reel 18 could be made long enough to be flush with the cover 56 of housing 12 or could extend through an aperture in the top cover of the housing. By lengthening the shaft slightly, the supply reel would not be usable with a standard video tape cassette, and thereby persons could not use the supply reel in a standard video tape cassette to defeat the one time viewing feature.

It should be noted that in this arrangement the conventionally used spring tensioning bar (not shown) for urging the supply and take-up tape reels resiliently against the bottom side of the housing 12 would be unsuitable. This spring normally pushes against the shaft of reel 18 and the shaft of reel 20. By lengthening the shaft of reel 18 and/or forming an aperture in the top cover of the housing, the spring can no longer be used for this purpose. Thus, a plurality of sponges or small springs could be placed circumferentially around the reels 18 and 20 which would cause the reels to be resiliently biased toward the top cover.

Thus, to defeat the one time viewing feature, a person would have to destroy the seal on the housing 12, and would then have to manually unwind the tape from supply reel 18 and manually rewind the tape on another reel. Physically, this would be impossible to accomplish without destruction of the tape.

Conventional video tape cassettes have included a pivotally mounted molded plastic dust cover for protecting the exposed portion 14 of the tape 15. In place of such a conventional pivotal dust cover, the exposed portion 14 of the tape in the present video tape cassette, as shown in FIG. 1, is covered and protected by a cover 16 which may be constructed of paper or the like and which covers and extends around the partially open edge of the cassette 10.

Thus the dust cover 16 provides a completely dust proof seal for cassette 10 and is only removed when it is desired to use the cassette 10 for the one time viewing of the pre-recorded material. Since the dust cover 16 effectively seals cassette 10 and prevents any dust from entering the housing 12, cassette 10 does not require any further packaging such as the conventional book-like plastic enclosure or a cardboard shipping box.

While this invention has been described as having a preferred design, it will be understood that it is capable of further modification. This application is therefore intended to cover any variations, uses, or adaptations of the invention following the general principles thereof and including such departures from the present disclosure as come within known or customary practice in the art to which this invention pertains and fall within the limits of the appended claims.

What is claimed is:

1. A video tape cassette adapted to be removably inserted into a video tape cassette machine which includes a magnetic reading head, said cassette comprising:
   a housing defining a generally enclosed chamber;
   a supply reel and a take-up reel rotatably mounted within said chamber, said supply reel adapted to have wound thereon a flexible magnetic tape having pre-recorded information thereon, said magnetic tape including a substrate and a layer of magnetic material thereon;
   said take-up reel adapted to take up said tape from said supply reel, a portion of said tape being accessible to a reading head as said tape is being wound on said take-up reel; and
   mutilating means mounted in said chamber for physically progressively and continuously puncturing said substrate and layer of magnetic material to mutilate of said tape as it is being would onto the take-up reel, whereby said tape may be read only once for a one time viewing of the pre-recorded information prior to the progressive mutilation of said tape.

2. The cassette according to claim 1 wherein said mutilating means is a cutting blade for progressively cutting said tape into a plurality of strips.

3. The cassette according to claim 1 including a completely removable cover for said accessible portion of said tape.

4. The cassette according to claim 1 including means for preventing rotation of said supply reel during shipment of said tape.

5. The cassette according to claim 4 wherein said rotation preventing means comprises a cap for simultaneously engaging a hub of said supply reel and said housing, whereby said supply reel is locked to said housing.

6. The cassette according to claim 1 wherein said cassette housing is sealed and cannot be opened without destruction of said housing.

7. A video tape cassette adapted to be removably inserted into a video cassette recorder, said cassette comprising;
   a housing defining a generally enclosed chamber;
   a supply reel and take-up reel rotatably mounted in said chamber;
   a flexible magnetic tape including a substrate and a layer of magnetic material thereon said tape having prerecorded information thereon, said tape being wound on said supply reel and having a leading end portion thereof connected to said take-up reel;

means supported by said housing for guiding said tape from said supply reel to said take-up reel along a predetermined path;

mutilating means mounted on said housing adjacent said said substrate and layer of magnetic material to mutilate said tape as said tape is wound on said take-up real from said supply reel, whereby said tape may be read once only for a one time viewing of the pre-recoreded information.

8. The cassette according to claim 7 wherein said mutilating means comprises a cutting blade for progressively cutting said tape into a plurality of strips.

9. The cassette according to claim 7 including a completely removable cover for said accessible portion of said tape.

10. The cassette according to claim 7 including means for preventing rotation of said supply reel during shipment of said cassette.

11. The cassette according to claim 10 wherein said rotation preventing means comprises a cap for engaging a hub of said supply reel and said housing, whereby said supply reel is locked to said housing to prevent rotation of said supply reel.

12. The cassette according to claim 7 wherein said cassette housing is sealed and cannot be opened without destruction of said housing.

13. A method of using a video tape cassette having a housing enclosing a supply reel and a take-up reel with a magnetic tape wound on the supply reel and having the leading end thereof wound on the take-up reel, said tape including a substrate and a layer of magnetic material thereon, said method comprising the steps of;

recording information on said tape;

winding said tape on said supply reel;

feeding said tape from the supply reel through a video cassette player;

winding the tape on said take-up reel to provide for viewing of the pre-recorded information; and physically progressively and continuously puncturing said substrate and magnetic material to mutilating as said tape is wound on said take-up reel, thereby rendering said tape unfit for further viewing.

14. The method according to claim 13 including the step of sealing said housing.

* * * * *

UNITED STATES PATENT AND TRADEMARK OFFICE
CERTIFICATE OF CORRECTION

PATENT NO.  : 4,842,217

DATED       : June 27, 1989

INVENTOR(S) : David A. Vinson

It is certified that error appears in the above-identified patent and that said Letters Patent is hereby corrected as shown below:

Col. 2, line 6, before "only" insert --viewed--;
Col. 2, line 16, after "leading" delete "10";
Claim 1, Col. 6, line 35, after "mutilate" delete "of";
Claim 7, Col. 7, line 5, after "said", first occurrence, insert
    --tape path for physically continuously and progressively
    puncturing progressively--;
Claim 7, Col. 7, line 9, change "pre-recoreded" to
    --pre-recorded--;
Claim 13, Col. 8, lines 17 and 18, delete "mutilating" and
    substitute therefore --mutilate said tape--.

Signed and Sealed this

Twenty-seventh Day of February, 1990

*Attest:*

JEFFREY M. SAMUELS

*Attesting Officer*   *Acting Commissioner of Patents and Trademarks*